United States Patent Office

3,127,440
Patented Mar. 31, 1964

3,127,440
MIXTURES OF ESTERS OF UNSUBSTITUTED UNSATURATED 1,4 DICARBOXYLIC ACIDS HAVING 4 CARBONS AND $C_{30}$—$C_{60}$ SATURATED ALCOHOLS
Leslie L. Sims, Baton Rouge, La., assignor to Ethyl Corporation, New York, N.Y., a corporation of Virginia
No Drawing. Filed May 8, 1962, Ser. No. 193,334
4 Claims. (Cl. 260—485)

The present invention relates to novel hard waxes yielding films with a high surface gloss.

Carnauba wax, as outlined by Warth in "The Chemistry and Technology of Waxes" 2d edition (1960) Reinhold Publishing Company, New York, is recognized as the most superior wax in the art, and is very expensive. Carnauba wax is obtained from the leaves of a species of an American genus of palm designated as the Copernicia cerifera. The mature leaves of the palm are cut from the tree and sun-dried. After the drying step, which loosens the wax from the leaves, the leaves are transported to sheds. The leaves so treated are ripped apart by hand and beaten to remove the wax dust which is then recovered from the floor. The average leaf of the palm yields only about 5 grams of wax. The average tree gives a maximum of about 20 leaves a year. Thus, five palms give about one pound of wax per year. This small yield of wax necessitates having about 50,000,000 trees in production. The average yields and quality of this wax, like other agricultural crops, are also directly affected by the weather during the growing year. Thus it is seen that carnauba wax is not too plentiful and is expensive to produce and is of variable quality.

In the past, many attempts have been made to produce new waxes and additives for various waxes so as to approximate the beneficial properties of carnauba wax by means of cheaper and more abundant materials. One such attempt has been to esterify a mixture of montanic acids with polyhydric alcohols to obtain products which are somewhat superior to montanic acids as waxes. Still another attempt has been to convert free acid groups of products obtained by partial esterification of montanic acids with polyhydric alcohols largely into salts by reacting them with substances forming wax soaps and thus to obtain waxes which are distinguished by very good oil binding properties and yielding paste, leaving behind a glossy wax film. The products obtained by this method are soft.

It has also been known in the past to produce ester waxes by reacting aliphatic acids having more than 18 carbon atoms, such as acids contained in montan wax, with aromatic methylols. These acids are first bleached by oxidation and then reacted with the aromatic dimethylol. It has been taught in U.S. Patent 2,963,379, that the reaction product of aliphatic acids having more than 18 carbon atoms with aliphatic alcohols will not produce waxes with a high surface gloss and hardness in the carnauba wax range.

U.S. Patent 2,877,123 has described proportionately mixed saturated straight chain and saturated branched chain dibasic acid esters each ester containing a total of 16 to 64 carbon atoms. Typical of the esters described therein are the dimethyl ester of octadecadiene-7,11-dicarboxylic acid-1,18; dimethyl ester of 7-vinyl-hexadecene-9-dicarboxylic acid-1,16; dimethyl ester of the $C_{20}$-diethylenic dicarboxylic acids, and the like. These products are described as soft, semi-solids at room temperature and therefore do not have the desirable properties of the hard carnauba wax.

It is therefore an object of the present invention to provide a new relatively inexpensive wax which can be readily synthesized from available raw materials and which has desirable properties approximating those of carnauba wax. It is a further object of the present invention to produce novel mixed diesters of unsaturated carboxylic acids which when applied to a surface leave a hard, glossy film. Other objects will appear more fully hereinafter.

It has now been found that hard waxes yielding films of high gloss are obtained by the provision of compositions consisting essentially of a mixture of dialkyl esters of at least one symmetrical unsaturated 1,4-dicarboxylic acid having 4 carbon atoms. The alkyl esters are characterized by having a variety of alkyl groups each containing from about 30 to about 60 carbon atoms. It is most particularly preferred that the alkyl groups of the esters have even numbers of carbon atoms since the alcohols employed, having even numbers of carbon atoms, are more economical and easily obtained.

Thus within the scope of this invention hard waxes are obtained from compositions comprising mixtures of one or more of the above carboxylic acids esterified with mixtures of high molecular weight alcohols. Such alcohols are alkanol mixtures in which the individual members contain from about 30 to about 60 carbon atoms at least two of which differ from each other in carbon content.

The 1,4-dicarboxylic acids and mixtures thereof which are employed in producing the novel mixed diesters are maleic acid and acetylene dicarboxylic acid. Fumaric acid, the trans isomer of maleic acid, may also be employed. The mixed dialkyl esters of these acids, having from about 30 to about 60 carbon atoms, are excellent waxes having a hardness and surface gloss similar to carnauba wax. Furthermore, these wax esters which possess the excellent properties of carnauba wax are considerably more economical.

The alcohols employed in this invention comprise a mixture of two or more alcohols. These alcohol mixtures are preferably essentially straight chain aliphatic alcohols having up to about 20 weight percent of beta-branched alcohols present. Generally the beta-branched alcohols present in the mixture are alcohol reactants having the formula:

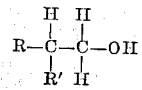

wherein R and R' are essentially straight chain alkyl groups having from about 28 to about 58 carbon atoms. Most preferably aliphatic alcohols having branched chain alcohol contents ranging on a weight basis from about 0 percent up to about 10 percent are employed.

Typical examples of the alcohols present in the alcohol mixtures are n-triacontanol, n-hentriacontanol, n-dotriacontanol, n-tetratriacontanol, n-pentatriacontanol, n-hexatriacontanol, n-heptatriacontanol, n-octatriacontanol, n-nonatriacontanol, n-tetracontanol, n-hentetracontanol, n-dotetracontanol, n-tritetracontanol, n-tetratetracontanol, n-pentatetracontanol, n-hexatetracontanol, n-heptatetracontanol, n-octatetracontanol, n-nonatetracotanol, n-pentacontanol, n-henpentacontanol, n-dopentacontanol, n-tripentacontanol, n-tetrapentacontanol, -pentapentacontanol, i-hexapentacontanol, n-heptapentacontanol, n-octapentacontanol, n-nonapentacontanol, and n-hexacontanol.

Typical of the beta-branched alcohols present in the alcohol reactant are beta-ethyltriacontanol, beta-butyltriacontanol, beta-hexyltriacontanol, beta-ethylhentriacontanol, beta-butyldotriacontanol, beta-octatetratriacontanol, beta-octadecyltriacontanol, and the like. It should be noted that these beta-branched alcohols may be present in amounts ranging from about 0 up to about 20 weight percent.

The term "mixtures" as used herein above may be defined as physical mixtures of two or more alcohols having from about 30 to about 60 carbon atoms so long as at least two of the alcohols differ from each other in carbon content by at least one and preferably by at least two carbon atoms. Typical examples of mixtures of these alcohols are: 2-component systems such as n-triacontanol and dotriacontanol, tetratriacontanol and hexatriacontanol; 3-component systems such as tricontanol, tetracontanol, and pentacontanol; 4-component systems such as dotriacontanol, octatetracontanol, tetrapentacontanol, and hexacontanol. Other systems comprising a mixture of 5 through about 60 different alcohols including beta-branched alcohols are within the ambit of this invention.

The most particularly preferred mixtures of alcohols are those prepared from a mixture of alphaolefins having as components thereof triacontene, dotriacontene, tetratriacontene, hexatriacontene, octatriacontene, tetracontene, dotetracontene, tetratetracontene, hexatetracontene, octatetracontene, pentacontene, dopentacontene, tetrapentacontene, hexapentacontene, octapentacontene, and hexacontene. These alpha-olefins were indicated to be present in the mixture by gas chromatographic analysis.

Mixtures of alpha-olefins such as the particularly preferred mixtures set forth herein above are conveniently converted to primary alcohol mixtures by any number of techniques. For example, long chain alpha-olefins (i.e., $C_{30}$ to $C_{60}$ alpha-olefins) may be treated with an acid in the presence of a peroxide to obtain an anti-Markownikoff addition product. A typical example of this is the reaction of the desired mixture of alpha-olefins with hydrogen bromide in the presence of a peroxide to obtain the alkyl bromide which can be converted to the primary alcohols by hydrolysis. Still another technique of obtaining the desired mixture of alcohols is by hydroboration. A typical example of a hydroboration reaction is the addition of sodium borohydride and boron trifluoride diethyl etherate complex in a solvent such as the dimethyl ether of diethylene glycol. To this mixture is added the alpha-olefin mixture which reacts with the diborane, which was formed in situ, to produce the hydroborated olefin. The hydroborated olefin is then treated with sodium hydroxide and hydrogen peroxide to obtain the primary alcohol. The hydroboration process is essentially set forth in the "Journal of Organic Chemistry," September 1957, pages 1136 and 1137.

The higher alpha-olefins, having low branched olefin content, which are used to produce the most desired primary alcohols are obtained by reacting ethylene in the presence of a trialkylaluminum catalyst at a temperature of about 140° to 225° C. and a pressure of about 700 p.s.i. The process of producing these alpha-olefins having low vinylidene content (beta branching) is set forth in copending application S.N. 59,190, filed September 29, 1960.

The advantages of the novel mixed esters of this invention are many in number. As stated hereinbefore, these novel ester mixtures have a hardness within the carnauba wax range. These esters also exhibit excellent luster when applied to a surface to be waxed. The esters are also capable of being emulsified. Raw waxes, such as carnauba, obtained from natural sources are expensive and require purification and bleaching. In contrast, the ester of this invention involve but a fraction of the cost of the natural carnauba waxes and require no costly bleaching and purification process, the mixed ester products being light colored solids. Furthermore, many natural waxes have an odor which must be disguised by the addition of an additive to lessen its odoriferous properties. Unlike these natural products, the diesters of the present invention have no odor, or at least no offensive odor. Still other advantages will be seen from the ensuing description.

The novel mixed diesters of this invention may be produced by many esterification methods. For example, the mixture of molecular weight alcohols is reacted with the desired unsaturated dicarboxylic acid(s) (or the anhydride thereof) at temperatures ranging from about 90 to about 300° C. in the presence or absence of any of the recognized solvents which are inert to the reactants and the reaction products. This reaction may or may not be conducted in the presence of an acid catalyst.

Typical of these solvents which may be employed are benzene, toluene, xylene, hexane, cyclohexane, and the like. This esterification process, although not necessary, may be conducted in the presence of an esterification catalyst such as a mineral acid.

Typical of the acid esterification catalysts which may be used are sulfuric acid, phosphoric acid, and p-toluene sulfonic acid.

Another typical method of producing these novel ester mixtures is by reacting the anhydride of the desired acid or the acid itself with the alcohol mixture at temperatures ranging from about 90° C. to about 150° C. to produce the half ester. The half ester is further reacted with the remainder of the alcohol mixture in the system at higher temperatures, i.e., from about 180° C. to about 270° C. with $CO_2$ bubbled through the reaction mass. The diester is recovered upon cooling.

These novel dialkyl mixed esters and the process by which they are produced will be further understood from the following examples in which all parts are by weight unless otherwise specified.

EXAMPLE I

In order to prepare a mixture of alcohols particularly suitable for use in the preparation of a mixture of esters of this invention, a mixture of alpha-olefins was converted to the corresponding alcohols by a hydroboration technique. In particular, the principal members of this olefin mixture were: triacontene, dotriacontene, tetratriacontene, hexatriacontene, octatriacontene, tetracontene, dotetracontene, tetratetracontene, hexatetracontene, octatetracontene, pentacontene, dopentacontene, tetrapentacontene, hexapentacontene, octapentacontene, and hexacontene. This mixture of olefins is produced by the technique set forth in Example VII of copending application S.N. 59,190. The fraction of olefins having greater than 18 carbon atoms (42.5 weight percent) was subjected to distillation to remove alpha-olefins having less than about 28 carbon atoms. The resultant mixture was then subjected to molecular distillation to obtain said mixture of alpha-olefins having between about 30 and about 60 carbon atoms. The presence of these alpha-olefins was proven by gas chromatographic analysis. The analysis so obtained indicated that the weight percentages of the foregoing olefins in the mixture decreased with increasing molecular weight.

To said mixture of alpha-olefins (36.8 parts) was added 30 parts by volume of sodium borohydried. This mixture was warmed and stirred while 1.1 parts of boron trifluide diethyl etherate catalyst was added dropwise over a one hour period. The reaction product was cooled and 10.5 parts by volume of sodium hydroxide was added, followed by the dropwise addition of 20 parts by volume of hydrogen peroxide. During the addition of the sodium hydroxide and hydrogen peroxide the mixture was stirred and heated to 100° C. The reaction mass was then cooled and a solid product was collected by filtration to give a quantitative yield of an alcoholic mixture consisting essentially of triacontanol, dotriacontanol, tetratriacontanol, hexatriacontanol, octatriacontanol, tetracontanol, dotetracontanol, tetratetracontanol, hexatetracontanol, octatetracontanol, pentacontanol, dopentacontanol, tetrapentacontanol, hexapentacontanol, octapentcontanol, and hexacontanol, said mixture having a melting point of 97° to 100° C.

The alcohol mixture (7.5 parts) was added to 2.1 parts of maleic anhydride. The reactants were heated to 130° C. for three hours with stirring. After this time, the temperature was raised to 200° C. and carbon dioxide bubbled through the reaction mixture. An additional 7.5 parts of the alcohol mixture was added and the temperaturt of the reaction mass raised to 220° C. for 2.5 hours with the addition of carbon dioxide continuing. The reaction mass was cooled and the mixed alcoholic diester of maleic acid was recovered. The mixed alcohol esters were recrystallized from toluene and found to have a melting point of 89–94° C. The mixture was recrystallized a second time from toluene and found to have a melting point of 98–101° C.

The mixed diester product was subjected to a penetrometer test which gave a reading of 3. The penetrometer reading is a measure of insertion of a needle in the bulk of the wax specimen using a standard weight at a standard temperature for a standard time. Therefore, the lower the number the harder the wax. The penetrometer readings were taken under standard conditions which are 5 seconds at 25° C. with 100 gram weight. This measurement was in conformance to ASTM test No. D1168–51T.

EXAMPLE II

Acetylene dicarboxylic acid (5.7 parts) is reacted with a mixture of alcohols (12 parts) having from 30 to 60 carbon atoms, produced in the same manner as set forth in Example I, at a temperature of 130° C. for one hour while bubbling carbon dioxide through the reaction mixture. The temperature of the reaction mass is then raised to 220° C. for 2.5 hours during which carbon dioxide is continuously added. The reaction mass is then allowed to cool and the mixed diesters of acetylene dicarboxylic acid are recovered as a solid material.

EXAMPLE III

Fumaric acid (11.6 parts) is reacted with 104 parts of a mixture of alcohols (20 parts) containing from 30 to 60 carbon atoms, produced in the same manner as set forth in Example I, at a temperature of about 170° C. for 2.5 hours while bubbling carbon dioxide through the reaction mixture. The temperature of the reaction mass is then raised to 250° C. while continuing the addition of carbon dioxide for one hour. After this time, the reaction mass is allowed to cool and the product, a mixture of esters of fumaric acid, is recovered.

EXAMPLE IV

Acetylene dicarboxylic acid (2.8 parts) and maleic acid (2.8 parts) is reacted with a mixture of alcohols consisting essentially of equimolar quantities of triacontanol and hexatriacontanol (12 parts). The reaction mass is heated to 130° C. for one hour while bubbling carbon dioxide through the mixture. The temperature of the reactor is then raised to 220° C. for one and a half hours during which carbon dioxide is continuously bubbled through the mixture. The reaction mass is then allowed to cool and the mixed diesters of acetylene dicarboxylic acid and maleic acid are recovered as solid material.

EXAMPLE V

Fumaric acid (5 parts) is reacted with a mixture of alcohols consisting essentially of triacontanol, dotriacontanol, tetratriacontanol, and pentatriacontanol (10 parts). The procedures of Example II were repeated and the product, the mixed esters of fumaric acid, recovered.

When the above examples are repeated using other mixtures of alcohol similar results are obtained yielding esters valuable as waxes. Typical of these other alcohol mixtures which can be employed are:

(1) Triacontanol and hentriacontanol (equal molar portions).

(2) Triacontanol, hexatriacontanol, tetracontanal, and hexatetracontanol (40 weight percent of triacontanol, 30 weight percent of hexatriacontanol, 10 weight percent of tetracontanol, 10 weight percent of hexatetracontanol).

(3) Hentriacontanol, tetratriacontanol, pentatriacontanol, hexatriacontanol (30 weight percent of hentriacontanol, 20 weight percent of tetratriacontanol, 20 weight percent of pentatriacontanol, and 30 weight percent of hexatriacontanol).

(4) Octatriacontanol, nonatriacontanol, tetracontanol, hentetracontanol, dotetracontanol, and hexacontanol (20 weight percent of octatriacontanol, 30 weight percent of nonatriacontanol, 30 weight percent of tetracontanol, 10 weight percent hentetracontanol, 10 weight percent of dotetracontanol, and 10 weight percent of hexacontanol).

(5) Tricontanol, tetracontanol, octatetracontanol, pentacontanol, henpentacontanol, dopentacontanol, hexapentacontanol, octapentacontanol, and hexacontanol (50 weight percent of tricontanol, 10 weight percent of tetracontanol, 10 weight percent of octatetracontanol, 5 weight percent of pentacontanol, 5 weight percent of henpentacontanol, 5 weight percent of dopentacontanol, 5 weight percent of hexapentacontanol, 5 weight percent of octapentacontanol, and 5 weight percent of hexacontanol.

(6) Triacontanol, pentatriacontanol, octatriacontanol, hentetracontanol, heptatetracontanol, pentacontanol, tripentacontanol, tetrapentacontanol, octapentacontanol, and hexacontanol (22 weight percent of triacontanol, 15 weight percent of pentatriacontanol, 17 weight percent of octatriacontanol, 15 weight percent of hentetracontanol, 9 weight percent of heptatetracontanol, 6 weight percent of pentacontanol, 5 weight percent of tripentacontanol, 5 weight percent of tetrapentacontanol, 4 weight percent of octapentacontanol, and 3 weight percent of hexacontanol).

The following table sets forth the data gathered from comparative penetrometer tests showing the hardness of various waxes as compared to a mixed ester of the present invention. In these tests, runs were made on the mixed dialkyl maleate product of Example I and on a number of comparative substances. This data demonstrates that the esters of the present invention have a hardness well within the carnauba wax range and superior to various other waxes.

Table

COMPARATIVE PENETROMETER TESTS

| Material tested: | Penetrometer reading [a] |
|---|---|
| Carnauba wax | 2 |
| Candelila wax | 4 |
| Stearic acid | 7 |
| Montan wax | 17.5 |
| Beeswax | 32 |
| Docosene-1 | [b] |
| Maleate diester of $C_{20}$ to $C_{30}$ alcohols | [b] |
| Mixed dialkyl esters of maleic acid having from about 30 to about 60 carbon atoms in the alkyl groups | 3 |

[a] Readings taken under standard conditions, i.e., for 5 seconds, at 25° C. and with a 100 g. weight according to ASTM test No. D1168–51T.
[b] Too soft to measure.

Comparative water emulsions were made of carnauba wax and the mixed diester of maleic acid of Example I. These emulsions were prepared in accordance with the procedures described by H. Bennett in "Practical Emulsions," Chemical Publishing Company (1943), page 367, formula No. 7. This emulsion procedure comprised mixing 11.2 g. of the wax ester which is stirred and melted, with 2.4 g. of oleic acid and 2.2 g. of morpholine. Boiling water (67 g.) is added in portions to the rapidly stirring mixture. A second emulsion is prepared by adding boiling water, 15.5 g. to a stirring mixture of shellac (15.5 g.) and 0.2 g. of morpholine. These separate emulsions are then mixed and stirred together. This procedure was completed for both carnauba and the mixed alkyl maleate. The carnauba wax emulsion was applied to a piece of vinyl floor tile and compared to the wax emulsion containing the novel diester of the present invention ($C_{30}$ to $C_{60}$ ester of maleic acid). It was found that the wax emulsion of the mixed ester of maleic acid had a similar glossy appearance when compared to the vinyl tile treated with the carnauba wax emulsion. When a drop of water was applied to the vinyl tile coated with the mixed diester of maleic acid no water spotting occurred.

From the data above, it has been demonstrated that the novel mixed diesters of the present invention, have a hardness essentially equal to carnauba wax and when emulsified give a high surface gloss to the substance treated. These esters which are comparable to the beneficial properties of carnauba wax, combined with other advantageous features, e.g., no required costly purification, no costly handling, and no dependence upon weather conditions for a good agricultural crop, make these novel diesters of value to the wax industry.

While the novel mixed diesters of this invention have been primarily discussed from the standpoint of using unsaturated dicarboxylic acids having 4 carbon atoms, it should be noted that other aliphatic unsaturated dicarboxylic acids may be employed. Typical of these other acids are the cis and trans forms of 2-hexenedioic acid; the cis or trans forms of 3-octenedioic acid; 2-pentynedioic acid; 2-hexynedioic acid, and the like.

Likewise, while the alcohols have been discussed with particular emphasis on primary alcohols, it should be noted that secondary alcohols may also be employed in the present invention. Typical of these alcohols are sec-triacontanol, sec-tetracontanol, sec-pentacontanol, sec-hexacontanol, and the like.

The ratio of acid(s) or anhydride(s) to alcohol mixture in the esterification reaction is preferably essentially stoichiometric. When large excesses of alcohol mixture are employed the unreacted alcohol mixture is difficult to separate from the ester. Sometimes it is preferred to employ a slight excess of either reactant if either is volatile at reaction temperatures.

The reaction time required in the process of producing the novel mixed diesters of this invention generally ranges from about thirty minutes up to about six hours. The most preferred reaction time generally ranges from about one hour to about five hours since the mixed diester products obtained during this reaction time are in sufficient yields to make the process economical.

The temperature employed during the esterification process, as in other esterification procedures, generally ranges from about 90° C. up to about 300° C. The preferred temperature employed during the esterification process generally ranges from about 110° C. up to about 270° C.

The pressure employed during the esterification process generally can range from sub-atmospheric to greater than atmospheric. The pressures can range from about 100 mm. up to about 2000 mm. of mercury. It is preferred, however, to employ pressures ranging from atmospheric, i.e., 760 mm., to slightly above atmospheric, i.e., about 900 mm., since this is a more economical procedure and esters having excellent properties are produced within this range.

It is generally preferred during the esterification process to employ carbon dioxide by bubbling the gas through the reaction mass while it is being stirred. While not desiring to be bound by theoretical considerations, it is believed that the carbon dioxide acts as a combination of (1) an acid to catalyze the reaction and (2) as a "sweeping gas" to remove water formed during the esterification process. The amount of carbon dioxide employed will generally vary over a wide range. Generally it is preferred to introduce the carbon dioxide into the reaction mass during the heating and stirring process and the amounts will generally vary from 10 moles to about 1000 moles carbon dioxide.

As stated hereinbefore, acid esterification catalysts such as mineral acids may or may not be employed. Generally in the process of this invention, it is preferred not to employ a mineral acid catalyst since excellent results are obtained employing carbon dioxide in the process. Furthermore, when carbon dioxide is employed in lieu of the acid catalysts no removal of the catalyst from the end product is required.

Solvents may be employed in the esterification process although it is not essential in producing the novel diesters of this invention. Generally at the temperatures employed, the alcohols used in esterifying the acids will melt and form the solvent system. However, when the solvents are employed, any solvent may be used which is inert to the reaction mass. Typical of these classes of solvents are the petroleum hydrocarbans, diethers, glycol ethers, cyclic ethers, aromatics, and the like. These classes include as solvents benzene, toluene, xylene, hexane, cycloexane, diethyl ether, dibutyl ether, dimethyl ether of diethylene glycol, the diethyl ether of diethylene glycol, tetrahydrofuran, tetrahydropyran, gasoline, kerosene, naphthas, and the like.

From the description of the novel products of this invention hereinbefore, it is seen that these compounds have utility as waxes. These esters may be formulated as shown hereinbefore to produce emulsions which may be used as floor polishes, furniture polishes, and the like.

Having thus described the embodiments of the present invention, it is not desired to be bound except as set forth in the following claims.

I claim:

1. Hard waxes yielding films of high gloss consisting essentially of a mixture of alkyl esters of at least one unsubstituted symmetrical unsaturated 1,4-dicarboxylic acid having 4 carbon atoms, said esters being characterized by having a variety of alkyl groups each containing from about 30 to about 60 carbon atoms.

2. The composition of claim 1 wherein said dicarboxylic acid is maleic acid.

3. The composition of claim 1 wherein said acid is acetylene dicarboxylic acid.

4. The composition of claim 1 wherein said alkyl groups have predominantly even numbers of carbon atoms.

References Cited in the file of this patent

UNITED STATES PATENTS

| 2,560,588 | Munday et al. | July 17, 1951 |
| 2,801,934 | Rizzo | Aug. 6, 1957 |

FOREIGN PATENTS

| 716,485 | Great Britain | Oct. 6, 1954 |

OTHER REFERENCES

Clorafin, Hercules Powder Co., page 13, rec. January 25, 1952.